(12) United States Patent
Miyamoto et al.

(10) Patent No.: US 6,715,771 B2
(45) Date of Patent: Apr. 6, 2004

(54) BOOT FOR CONSTANT VELOCITY UNIVERSAL JOINT

(75) Inventors: Kenji Miyamoto, Nishikasugai-gun (JP); Kazuya Watanabe, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/116,034

(22) Filed: Apr. 5, 2002

(65) Prior Publication Data
US 2002/0185825 A1 Dec. 12, 2002

(30) Foreign Application Priority Data

Apr. 20, 2001 (JP) .................................. 2001-122898
Feb. 26, 2002 (JP) .................................. 2002-050243

(51) Int. Cl.$^7$ ................................................ F16J 15/52
(52) U.S. Cl. .................................... 277/635; 277/636
(58) Field of Search ............................. 277/634–636, 277/650; 464/175

(56) References Cited

U.S. PATENT DOCUMENTS

| 4,278,262 | A | * | 7/1981 | Mizutani et al. | 277/636 |
|---|---|---|---|---|---|
| 4,556,399 | A | * | 12/1985 | Billet et al. | 464/175 |
| 4,693,484 | A | * | 9/1987 | Ukai et al. | 277/636 |
| 4,702,483 | A | * | 10/1987 | Ukai et al. | 277/636 |
| 4,730,834 | A | * | 3/1988 | Ukai et al. | 277/636 |
| 4,844,486 | A | * | 7/1989 | Schiemann | 277/636 |
| 4,957,469 | A | * | 9/1990 | Zollinger | 464/175 |
| 5,006,376 | A | * | 4/1991 | Arima et al. | 277/636 |
| 5,236,394 | A | * | 8/1993 | Collins et al. | 464/175 |
| 5,295,914 | A | * | 3/1994 | Milavec | 464/175 |
| 5,311,912 | A | * | 5/1994 | Hayward | 138/121 |
| 5,645,286 | A | * | 7/1997 | Katoh | 277/636 |
| 5,672,113 | A | * | 9/1997 | Tomogami et al. | 464/175 |
| 5,722,669 | A | * | 3/1998 | Shimizu et al. | 277/636 |
| 6,227,748 | B1 | * | 5/2001 | Hayward et al. | 403/50 |
| 6,478,309 | B1 | * | 11/2002 | Miyamoto et al. | 277/634 |

FOREIGN PATENT DOCUMENTS

JP            11-130952            5/1999

* cited by examiner

Primary Examiner—Alison K. Pickard
(74) Attorney, Agent, or Firm—Posz & Bethards, PLC

(57) ABSTRACT

A boot for a constant velocity universal joint includes a minor-diameter cylindrical member, a major-diameter cylindrical member, and a bellows member. At least the bellows member is formed of a thermoplastic elastomer exhibiting a kinetic friction coefficient of less than 0.6 when water intervenes in-between, and including crests. In the cross section of the bellows member involving the central axis, the peaks of the crests, excepting the crest neighboring the major-diameter cylindrical member as well as the crest neighboring the minor-diameter cylindrical member, are disposed on an inner diametric side with respect to a line connecting the peak of the crest neighboring the major-diameter cylindrical member with the peak of the crest neighboring the minor-diameter cylindrical member. Not only it is possible to downsize the boot, but also it is possible to inhibit abnormal noises from generating when water intervenes in-between.

7 Claims, 3 Drawing Sheets

BOOT FOR CONSTANT VELOCITY UNIVERSAL JOINT

BACKGROUND OF THE INVENTION

1. Field of the Invention

The present invention relates to a boot, which covers a constant velocity universal joint being indispensable to a joint for a driving shaft of a front-wheel-drive vehicle, and which inhibits water and dust from intruding into a joint unit of such a constant velocity universal joint.

2. Description of the Related Art

A joint unit of a constant velocity universal joint has been conventionally covered with a bellows-shaped boot. The boot inhibits water and dust from intruding, thereby enabling the constant velocity universal joint to keep rotating smoothly at a large joint angle. The boot for a constant velocity universal joint includes a major-diameter cylindrical member, a minor-diameter cylindrical member, and a bellows member. The major-diameter cylindrical member is held to a joint outer race, etc., and has a major diameter. The minor-diameter cylindrical, member has a diameter smaller than that of the major-diameter cylindrical member, and is held to a shaft. The bellows member connects the major-diameter cylindrical member with the minor-diameter cylindrical member integrally, and is formed as a truncated cone shape substantially. When the boot is put in service, the bellows member deforms in accordance with the variation of the angle, which is formed between the joint outer race, etc., and the shaft, (i.e., the joint angle). Accordingly, even when the joint angle enlarges, it is possible to securely seal the joint unit by the boot.

Moreover, in the bellows member of the conventional boot for a constant velocity universal joint, crests and roots have been formed alternately, and the respective crests and roots have usually been formed as similar shapes.

Incidentally, when the boot is put in service by installing it to a constant velocity universal joint, and when the constant velocity universal joint is rotated while it is bent at a large joint angle, there arises a case where the side surfaces of the neighboring crests of the bellows member are pressed heavily against with each other so that abnormal slipping sounds (hereinafter referred to "abnormal noises") are generated.

The cause of the abnormal noises is believed as follows. When a constant velocity universal joint rotates while it is bent, the boot starts rotating while the crests, which contact with each other, are stuck closely to each other in a case where the surface of the bellows member exhibits a large friction coefficient. However, since the peripheral lengths of the crests, which neighbor with each other, vary, there arise differences in the peripheral direction. As the rotation develops, the differences enlarge. Then, at a time when the repulsive forces, which result from the deviations, are greater than the sticking forces, the crests are separated from each other so that the stresses are canceled. The surface of the bellows member is cyclically fluctuated by the repetitions of the sticking and separation. The fluctuation results in the vibrations of the air around the bellows member. Thus, the abnormal noises are generated.

Actually, water is present on the surface of the bellows member. In such a case, the friction coefficient is reduced remarkably by the intervention of water. However, the portions, on which water exists, and the portions, on which water does not exist, coexist inevitably. Accordingly, the friction coefficient is considerably fluctuated locally so that the bellows member vibrates more greatly. Thus, the abnormal noises are generated even more harshly.

Therefore, in order to inhibit the generation of the abnormal noises, it is effective to reduce the friction coefficient of the entire bellows member. Accordingly, it is possible to think of forming at least the bellows member of a thermoplastic elastomer, which contains a wax, an oil, or the like. However, in order to effectively suppress the abnormal noises, it is necessary to include a wax, an oil, or the like, in a large amount in a thermoplastic elastomer. If such is the case, there arise drawbacks in that the bellows member is lowered in terms of the fatigue resistance, and in that it is deteriorated in terms of the moldablility. Moreover, it is not possible to solve the problem with regard to the generation of the abnormal noises, which result from the intervention of water.

Hence, in Japanese Unexamined Patent Publication (KOKAI) No. 11-130,952, for example, a boot for a constant velocity universal joint is disclosed, boot which is formed of a thermoplastic polyester elastomer in which at least one compound selected from the group consisting of polyethers and non-denatured polyolefines is compounded with respect to a polyester block copolymer. When the bellows member is formed of such a special resin, the compounded compound leaches out on the surface of the bellows member, and accordingly it is possible to suppress the abnormal noises, which result from the intervention of water. Moreover, since the compound exhibits a good affinity with respect to water, water is not completely excluded by the pressures, which are exerted by the surfaces of the crests contacting with each other. Thus, water is put into a state that it intervenes in-between entirely so that the abnormal noises are inhibited from generating.

In addition, in order to configurationally reduce the abnormal noises, it is a preferable means to enlarge the shape of the crests or to reduce the peripheral length differences between the crests, which neighbor with each other. With such an arrangement, since it is possible to reduce the pressures, which are exerted by the surfaces of the crests contacting with each other, and since it is possible to reduce the differences in the peripheral direction during the rotation, it is possible to suppress the abnormal noises.

Incidentally, it has been recently required to lightweight vehicles. As the size of vehicle bodies has been made compact, it has been required to make the shape of boots for constant velocity universal joints compact.

In order to make boots for constant velocity universal joints compact, it is necessary to reduce the outside diameter of the bellows members. When the outside diameter of a bellows member is reduced, the film length of the crests is shortened by such an extent. Accordingly, in order to keep the displacement of the bellows member and the stress generated at the bellows member equivalent to those of conventional bellows members, it is necessary to enlarge the depth of the roots. However, when the depth of the roots is simply enlarged, there arises a case where the second root, which is designated at the second one from the side of the major-diameter cylindrical member, is bitten between the joint outer race and the shaft when the joint angle, which is formed between the central axis of the joint outer race and the central axis of the shaft, is enlarged. When the root is bitten in such a manner, a large force acts to the root. When the action occurs repeatedly, the sealing property is impaired because of damage to the root. Therefore, the boot must be frequently replaced. Thus, the life of such a boot is short.

Moreover, reducing the outside diameter of a bellows member entirely results in enlarging the pressures, which are exerted by the surfaces of the crests contacting with each other, during the rotation. Thus, such a measure affects adversely in the suppression of the abnormal noises.

SUMMARY OF THE INVENTION

The present invention has been developed in view of such circumstances. It is therefore an object of the present invention to solve the contradictory phenomena, suppressing the abnormal noises during the rotation and making the shape compact.

The present invention can achieve the aforementioned object, and comprises: a minor-diameter cylindrical member being held to a shaft; a major-diameter cylindrical member being separated from the minor-diameter cylindrical member, being disposed coaxially with the minor-diameter cylindrical member and having a diameter larger than that of the minor-diameter cylindrical member; and a bellows member connecting the minor-diameter cylindrical member with the major-diameter cylindrical member integrally, being substantially formed as a truncated cone shape, being formed of a thermoplastic elastomer exhibiting a kinetic friction coefficient of less than 0.6 when water intervenes in-between and including crests, in the cross section of the bellows member involving the central axis, the peaks of the crests, excepting the crest neighboring the major-diameter cylindrical member as well as the crest neighboring the minor-diameter cylindrical member, being disposed on an inner diametric side with respect to a line connecting the peak of the crest neighboring the major-diameter cylindrical member with the peak of the crest neighboring the minor-diameter cylindrical member.

It is desired that at least the bellows member can be formed of a thermoplastic elastomer including a compound exhibiting a high affinity to water as well as a low friction coefficient and being capable of leaching out on the surface of the bellows member.

Further, it is desired that, when the crest, neighboring the major-diameter cylindrical member, has an outside diameter of $S_1$, and the crest, next to the crest, has an outside diameter of $S_2$, a two-crest compact ratio, expressed by "$S_2/S_1$," can be $0.77 \leq "S_2/S_1" \leq 0.85$.

Furthermore, it is desired that, when the bellows member is cut by a plane involving the axis, a line, connecting the peaks of the crests, can be formed as an arc shape having a radius "R" of from 100 to 200 mm.

Moreover, it is desired that the bellows member can include a plurality of crests and roots, at least a first root, a first crest, a second root, a second crest, a third root and a third crest, being disposed alternately in this order from the side of the major-diameter cylindrical member, and the outside diameter of the first crest can be substantially identical with the outside diameter of the major-diameter cylindrical member, and, in the cross section when the bellows member is cut by a plane involving the axis, the length of a line, extending from the peak of the first crest, passing over the second root and connecting the peak of the first crest with the peak of the second crest, can be substantially equal to the length of a line, extending from the peak of the second crest, passing over the third root and connecting the peak of the second crest with the peak of the third crest, and, when the second root has a depth of "h" and the third root has a depth "H," the depth "h" can fall in a range of "$H"/1.3 \leq "h" \leq "H"/1.1$.

Namely, in accordance with the boot according to the present invention for a constant velocity universal joint, it is possible not only to make the shape compact but also to inhibit the abnormal noises from generating. Accordingly, it is possible to lightweight vehicles and to improve the silence in vehicles.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
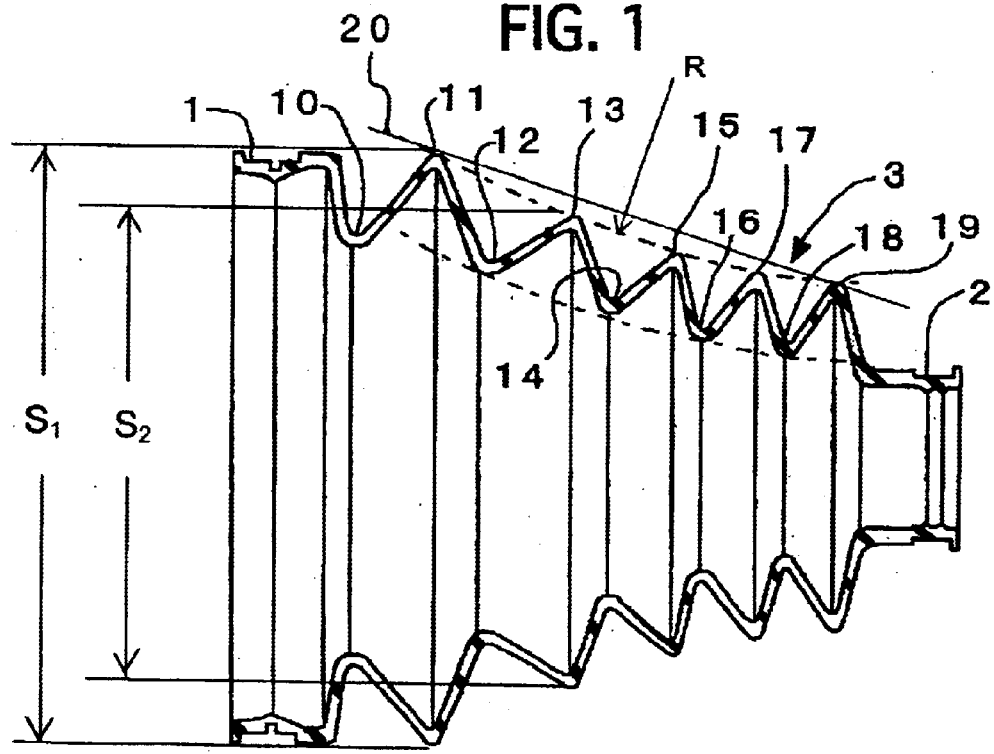
FIG. 1 is a cross-sectional view for illustrating a boot of an example according to the present invention.

Having generally described the present invention, a further understanding can be obtained by reference to the specific preferred embodiments which are provided herein for the purpose of illustration only and not intended to limit the scope of the appended claims.

In the boot according to the present invention for a constant velocity universal joint, at least the bellows member is formed of a thermoplastic elastomer exhibiting a sliding friction coefficient of less than 0.6 when water exists between its contacting surfaces. By forming the bellows member of such a resin, the abnormal noises are inhibited when the bellows member has water between its contacting surfaces. It is especially preferable to form the bellows member of a thermoplastic elastomer exhibiting a sliding friction coefficient of less than 0.4 when the bellows member has water between its contacting surfaces.

Further, in the boot according to the present invention for a constant velocity universal joint, in the cross section of the bellows member involving the central axis, the peaks of the crests, excepting the crest neighboring the major-diameter cylindrical member as well as the crest neighboring the minor-diameter cylindrical member, are disposed on an inner side of a straight line 20 connecting the peak of the crest neighboring the major-diameter cylindrical member with the peak of the crest neighboring the minor-diameter cylindrical member. Therefore, the shape of the bellow member is compact. Hence, by the present boot for a constant velocity universal joint, it is possible to suppress abnormal noises during the rotation while making the shape compact.

Furthermore, it is desired that at least the bellows member can be formed of a thermoplastic elastomer including a compound exhibiting a high affinity to water as well as a low friction coefficient and being capable of leaching out on the surface of the bellows member. By forming the bellows member of such a resin, the compound, which has been compounded in advance, leaches out on the surface of the bellows member. Therefore, water is not completely excluded by the pressures, which are exerted by the surfaces of the crests contacting with each other. Thus, water is put into a state that it intervenes in-between entirely so that it is possible to inhibit the abnormal noises from generating.

As for such a thermoplastic elastomer, the thermoplastic polyester elastomer, which is disclosed in Japanese Unexamined Patent Publication (KOKAI) No. 11-130,952, is an especially preferable material. When the thermoplastic polyester elastomer is used, at least one member selected from the group consisting of polyethers and non-denatured polyolefines, which have been compounded in the polyester block copolymer in advance, leaches out on the surface of the bellows member. Since these compounds exhibit a high affinity with respect to water, it is possible to inhibit the abnormal noises from generating in a state that water intervenes in-between.

Then, the present inventors studied wholeheartedly on the shapes of the bellows members and the generating situations of the abnormal slipping sounds. As a result, they found out that the product of the maximum pressure "P," which was exerted when the two neighboring crests contact with each other in service, and the peripheral length difference "L" between the portions of the crests, which are pressed against and contacted with each other, i.e., "P"דL," was an optimum index for downsizing the shapes as well as the generating situations of the abnormal noises. Specifically, the following have been found out. As set forth in a specific example described later, the larger the product "P"דL" is the larger the ratio of the diameters of the two neighboring crests is so that the resulting bellows member is made compacter. On the other hand, the smaller the product "P"דL" is the longer the time is required until the abnormal noises are generated so that the abnormal noises are inhibited from generating.

Further, by forming the bellows of a thermoplastic elastomer which exhibits a kinetic friction coefficient of less than 0.6 when water intervenes in-between, it has become possible, even if the products, "P"דL," are made identical, to further prolong the time until the abnormal noises generate. Therefore, when the bellows member is formed of such a material, and when the target value of the time until the abnormal noises generate is made constant, even if the product "P"דL" is made larger, it is possible to equalize the extent of the generation of the abnormal noises to those of conventional boots for constant velocity universal joints. Thus, the degree of freedom is improved greatly in designing a boot for a constant velocity universal joint.

Hence, in the present boot for a constant velocity universal joint, it is desired that, when the crest, neighboring the major-diameter cylindrical member, has an outside diameter of $S_1$, and the crest, next to the crest, has an outside diameter of $S_2$, the two-crest compact ratio, expressed by "$S_2/S_1$," can be $0.77 \leq "S_2/S_1" \leq 0.85$. With such an arrangement, it is possible to further downsize the shape of the bellows member while suppressing the abnormal noises. When the two-crest compact ratio "$S_2/S_1$" exceeds 0.85, it is difficult to downsize the shape of the bellows member. When it is less than 0.77, the product "P"דL" enlarges so that the abnormal noises are likely to generate.

Furthermore, it is desired that, when the bellows member is cut by a plane involving the axis, a line, connecting the peaks of the crests, can be formed as an arc shape having a radius "R" of from 100 to 200 mm. With such an arrangement, it is possible to easily satisfy the "P"דL" requirement between the respective crests. When the line, connecting the peaks of the crests, is formed as an arc shape having a radius "R" of less than 100 mm, the diametric differences between the two neighboring crests enlarge so that the target value of the product "P"דL" cannot be satisfied. When it is formed as an arc shape having a radius "R" of more than 200 mm, it is difficult to downsize the shape of the bellows member.

Moreover, it is desired that a line, connecting the bottom peaks of the roots, can be formed as an arc shape having a radius "R" of from 100 to 200 mm. When the line, connecting the bottom peaks of the roots, is formed as an arc shape having a radius "R" of less than 100 mm, the pressures, which are exerted between shaft and the roots at a large joint angle, increase sharply so that there arises a fear of wear therebetween. When the line, connecting the bottom peaks of the roots, is formed as an arc shape having a radius "R" of more than 200 mm, the film length is shortened at the central portion in the bellows member so that the fatigue resistance lowers, or there arises a case where the crests are dented at a large joint angle.

However, when the "L" is enlarged in order to enlarge the product "P"דL," the film length of the entire crests is shortened. Accordingly, in order to maintain the displacement of the bellows member and the generating stress equal to those of the conventional bellows members, it is necessary to enlarge the depth of the roots. However, when the depth of the roots is simply enlarged, there arises a problem of biting as described above.

Hence, it is desired that the bellows member can include a plurality of crests and roots, at least a first root, a first crest, a second root, a second crest, a third root and a third crest, being disposed alternately in this order from the side of the major-diameter cylindrical member, and that the outside diameter of the first crest can be substantially identical with the outside diameter of the major-diameter cylindrical member, and that, in the cross section when the bellows member is cut by a plane involving the axis, the length of a line, extending from the peak of the first crest, passing over the second root and connecting the peak of the first crest with the peak of the second crest, can be substantially equal to the length of a line, extending from the peak of the second crest, passing over the third root and connecting the peak of the second crest with the peak of the third crest, and that, when the second root has a depth of "h" and the third root has a depth "H," the depth "h" can fall in a range of "H"/1.3 $\leq$ "h" $\leq$ "H"/1.1.

In the specific boot according to the present invention for a constant velocity universal joint, the outside diameter of the first crest is made substantially identical with the outside diameter of the major-diameter cylindrical member. From the second crest on, the outside diameter of a crest is made gradually smaller than that of the former crest, of instance, the outside diameter of the second crest is smaller than that of the crest. Thus, the bellows member has a substantially truncated cone shape. Moreover, in the cross section when the bellows member is cut by a plane involving the axis, the length of the line, extending from the peak of the first crest, passing over the second root, and connecting the peak of the first crest with the peak of the second crest, is substantially equal to the length of the line, extending from the peak of the second crest, passing over the third root, and connecting the peak of the second crest with the peak of the third crest. Specifically, the film length between the first crest and the second crest is substantially equal to the film length between the second crest and the third crest. With such an arrangement, it is possible to secure a sufficient displacement between the first crest, the second root, the second crest, the third root and the third crest, which are parts that are deformed greatly in service in a constant velocity universal joint. Note that it is preferable to equalize the film lengths between arbitrary neighboring crests, respectively. When there are portions that have a partially shortened film length, large stresses act onto the portions when the bellows member is greatly displaced. Accordingly, there arises a drawback in that the fatigue resistance lowers. However, note that this is not the case for the film length, which is adjacent to the minor-diameter crest neighboring the minor-diameter cylindrical member, because the displacement is less at the portion.

In addition, in the specific boot according to the present invention for a constant velocity universal joint, the depth "h" of the second root is made so that it falls in the range of "H"/1.3≦"h"≦"H"/1.1 with respect to the depth "H" of the third root. By making the depth "h" of the second root, which is most likely to be bitten in the deformation, it is possible to inhibit the second root from being bitten even if the joint angle is enlarged as much as 50 deg. approximately. For example, when "h"="H"/1.2, it is possible to inhibit the second root from being bitten even if the joint angle is enlarged as much as 52 deg. approximately. When the depth "h" of the second root is less than "H"/1.3, it is difficult to secure a proper displacement because the film length of the second root is so short that the fatigue resistance lowers. When the depth "h" of the second root exceeds "H"/1.1, the biting of the second root is likely to occur.

Note that the distance between the first crest, the second root and the second crest is substantially equal to the distance between the second crest, the third root and the third crest. However, since the depth h of the second root is less than the depth H of the third root, the angle $\theta_1$ at the bottom of the second root is larger than the angle $\theta_2$ at the bottom of the third root.

Then, when the second root is inhibited from being bitten, the biting does not occur from the third and subsequent roots. Accordingly, no biting occurs in the specific boot according to the present invention for a constant velocity universal joint until the joint angle is enlarged about 50 deg. Thus, the lowering of the sealing ability, which results from damages, is securely inhibited from taking place. Therefore, the specific present boot exhibits an extremely long longevity.

Moreover, in addition to the above-described arrangements, it is preferable to form a fine indented pattern, or the like, on the surface of the bellows member. With such an extra arrangement, the areas, in which the side surfaces of the crests contact with each other, are decreased so that it is possible to further inhibit the abnormal noises from generating.

EXAMPLES

The present invention will be hereinafter described in detail with reference to examples and comparative examples.

Figure 2:
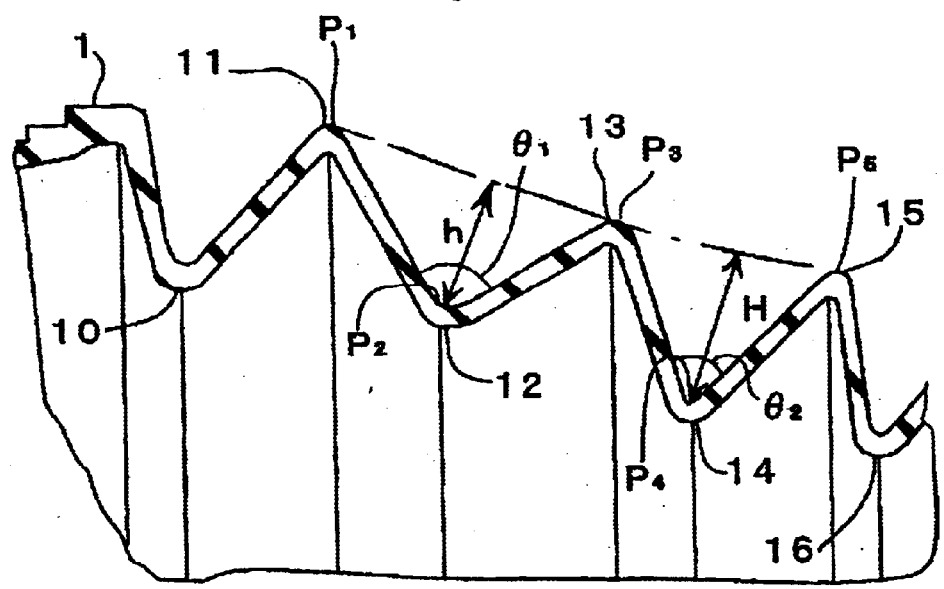
FIG. 2 is an enlarged view of the major portions in FIG. 1.

FIG. 1 illustrates a cross sectional view of an example of a boot according to the present invention for a constant velocity universal joint. FIG. 2 illustrates an enlarged cross sectional view of the major portions in FIG. 1. The boot comprises a major-diameter cylindrical member 1, a minor-diameter cylindrical member 2 and a bellows member 3. The minor-diameter cylindrical member 2 has a smaller diameter than that of the major-diameter cylindrical member 1. The bellows member 3 connects the major-diameter member 1 with the minor-diameter member 2 integrally, and is formed as a substantially truncated cone shape. The major-diameter member 1 and bellows member 3 are formed of a thermoplastic polyester elastomer, which is disclosed in Japanese Unexamined Patent Publication (KOKAI) No. 11-130,952, by blow molding. The minor-diameter member 2 is formed of the same thermoplastic polyester elastomer as that of the bellows member 3, and is manufactured integrally with the bellows member 3 by injection molding. Note that the bellows member 3 exhibits a kinetic friction coefficient of 0.33 when water intervenes in-between.

In the bellows member 3, crests and roots are formed alternately. Specifically, from the side of the major-diameter cylindrical member 1, there are formed a first root 10, a first crest 11 a second root 12, a second crest 13, a third root 14, a third, crest 15, a fourth root 16, a fourth crest 17, a fifth root 18 and a fifth crest 19. When the bellows member 3 is cut by a plane involving the axis, a line, connecting the peaks of the respective crests and a line connecting the bottom peaks of the respective roots, with the exception of the first root 10, are arcuate and each has a radius R of 150 mm. In other words, in the cross section involving the central axis, the peaks of the crests, except for the first crest 11 and the fifth crest 19, are located on an inner side, respectively, of a straight line connecting the peak of the first crest 11 and the peak of the fifth crest 19. Note that only the bottom peak of the second root 12 is located on an outer side of a line connecting the bottom peaks of the other roots.

The outside diameter of the first crest 11 is formed identical with the maximum outside diameter of the major-diameter cylindrical member 1. Then, when the bellows member 3 is cut by a plane involving the central axis, the length of a line "$P_1$-$P_2$-$P_3$," extending from the peak "$P_1$" of the first crest 11, passing over the bottom "$P_2$" of the second root 12 and connecting the peak "$P_1$" of the first crest 11 with the peak "$P_3$" of the second crest 13, is made equal to the length of a line "$P_3$-$P_4$-$P_5$," extending from the peak "$P_3$" of the second crest 13, passing over the bottom "$P_4$" of the third root 14 and connecting the peak "$P_3$" of the second crest 13 with the peak "$P_5$" of the third crest 15. Specifically, the film length between the first crest 11, the second root 12 and the third crest 13 is made equal to the film length between the second crest 13, the third root 14 and the third crest 15. Note that, except the film length between the fourth crest 17, the fifth root 18 and the fifth crest 19, the film length between one of arbitrary crests and its neighboring crest is made equal to the film length at the neighboring equivalent portions.

Moreover, the depth "h" of the second root 12 is in a relationship, "h"="H"/1.2, with respect to the depth "H" of the third root 14. The second root 12 forms an angle, $\theta_1$=approx. 90 deg., and the angle is larger than that of the neighboring first root 10 as well as the angle $\theta_2$ of the neighboring third root 14.

Except that the diameter of the second crest 13 of the bellows member 3 was varied variously, a plurality of boots according to the example were manufactured.

Comparative Examples

Figure 3:
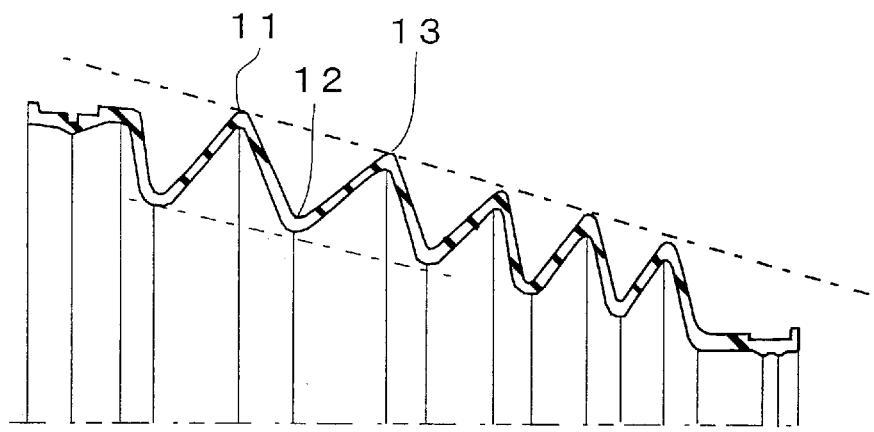
FIG. 3 is a semi-cross-sectional view for illustrating a boot of a comparative example.

Except that an ordinary thermoplastic elastomer was used as a material for molding, and that the line, connecting the respective crests, and the line, connecting the respective roots, are disposed in a linear manner, respectively, as illustrated in FIG. 3, a boot according to a comparative example has the same arrangements as those of the example. Note that, in FIG. 3, the parts, which are identical with those of the example, are designated with the same reference numerals.

Except that the dimension of the second crest 13 of the bellows member 3 was varied variously, a plurality of boots according to the comparative example were manufactured.

Evaluation

Figure 4:
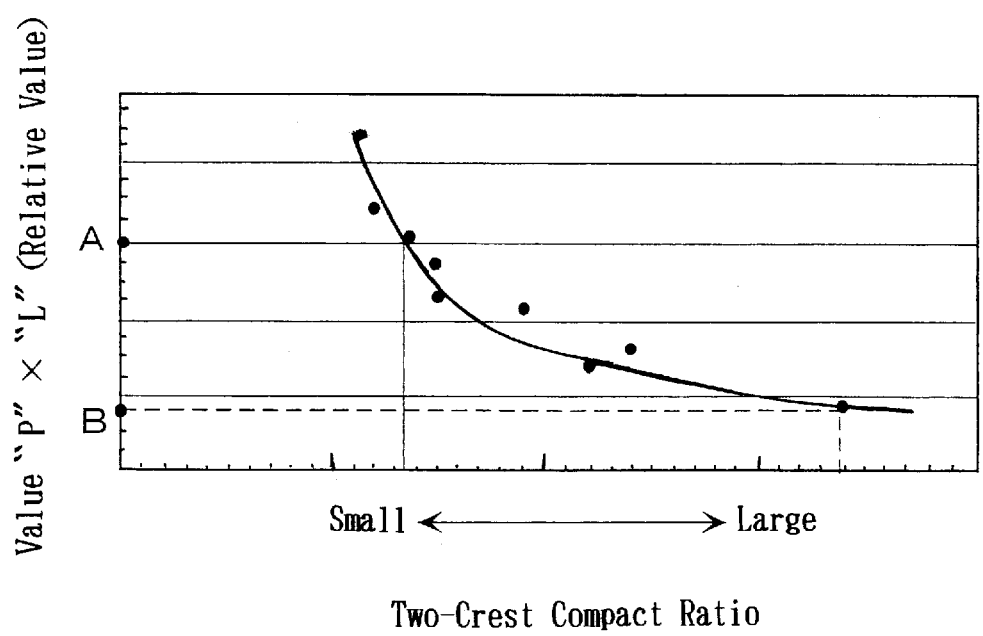
FIG. 4 is a graph for illustrating the relationship between two-crest compact ratios and products (i.e., "P"×"L")

With regard to the boots according to the example for a constant velocity universal joint, the maximum pressures "P," which were exerted between the first crest 11 and the second crest 13 when the constant velocity universal joint was bent by the maximum angle of 52 deg., were measured by CAE (i.e., computer-aided evaluation), respectively. At the same time, the products "P"דL," the maximum pressures "P" multiplied by the peripheral differences between the first crest 11 and second crest 13, were calculated, respectively. In addition, the rates "$S_2/S_1$," the rates of the outside diameter $S_2$ of the second crests 13 with respect to the outside diameter $S_1$ of the first crests 11, were calculated, respectively, as the two-crest compact ratios. Since the larger the two-crest compact ratio is the closer the outside diameter of the second crest 13 approaches the outside diameter of the first crest 11 so that the resulting boot is enlarged, it can be used as an index of downsizing. In FIG. 4, there is illustrated a graph in which the two-crest compact ratios are plotted against the horizontal axis and the products "P"דL" are plotted against the vertical axis.

Moreover, with regard to the boots according to the example as well as the comparative example for a constant velocity universal joint, the outside diameters of the respective crests were designated at $S_1$, $S_2$, $S_3$, and so on, from the respective first crests 11, the outside diameter ratios of the neighboring respective crests were measured. The results are set forth in Table 1 below.

TABLE 1

| Outside Dia. Ratio | $S_2/S_1$ | $S_3/S_2$ | $S_4/S_3$ | $S_5/S_4$ |
|---|---|---|---|---|
| Examples | 0.81 | 0.89 | 0.92 | 0.95 |
| Comp. Examples | 0.87 | 0.89 | 0.91 | 0.93 |

From FIG. 4, it is understood that the larger the two-crest compact ratio is the more the product "P"דL" is reduced, and that the more the boot is downsized the larger the product "P"דL" is. Note that, when the measurements were carried out similarly with regard to the boots according to the comparative example, the results were similar to those of the boots according to the example. Moreover, the biting of the second crests 12 did not occur in both of the boots according to the example as well as the comparative example. Thus, both of them were found good in terms of the fatigue resistance.

Figure 5:
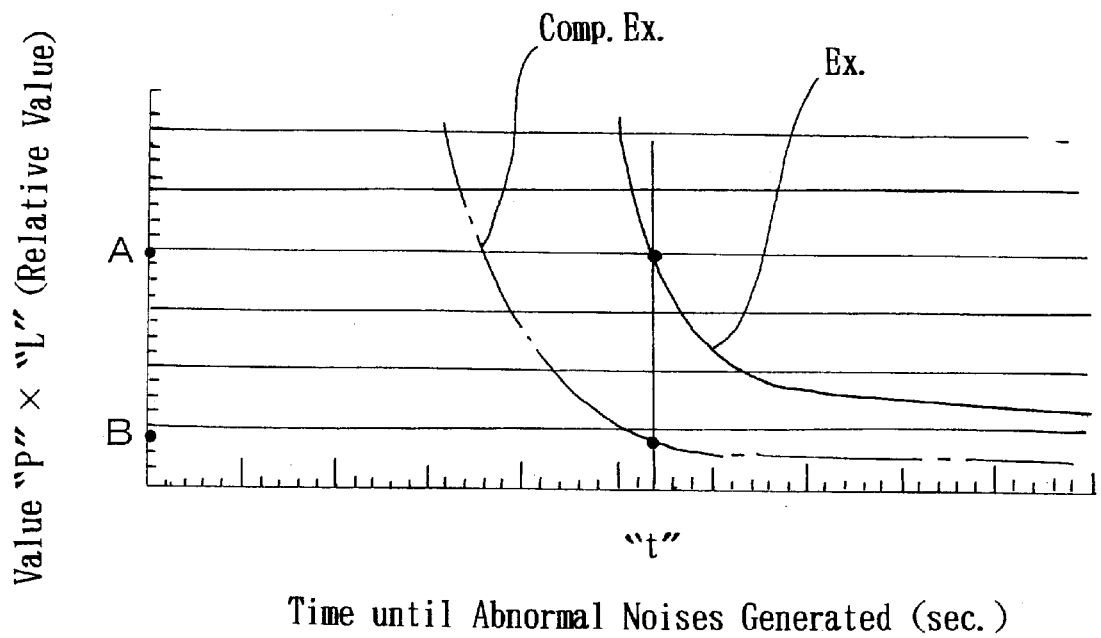
FIG. 5 is a graph for illustrating the relationships between times, at which the abnormal noises generated, and products (i.e., "P"×"L").

While, the boots according to the example as well as the comparative example were mounted onto a constant velocity universal joint, respectively, and were rotated with water adhered on the respective bellows members 3 under the conditions that the joint angle was 47 deg. and the number of the revolutions was 100 rpm. In the meantime, the times were measured, respectively, from the start of the rotation until the abnormal noises generated. In FIG. 5, there is illustrated a graph in which the times until the abnormal noises generated are plotted against the horizontal axis and the products "P"דL" are plotted against the vertical axis.

It is possible to say that the longer the time until the generation of the abnormal noises is the more the effect of the suppression of the abnormal noises is exhibited. Accordingly, from FIG. 5, it is understood that the product "P"דL" can preferably be smaller. However, from FIG. 4, when the product "P"דL" is small, the two-crest compact ratio enlarges so that the resulting boot is made larger.

Hence, when turning back to FIG. 5, it is appreciated that it took longer for the boots according to the example to generate the abnormal noises than the boots according to the comparative example did. In other words, when the target time until the abnormal noises generated is considered "t" sec. or more, and when the products "P"דL" at the moment are compared with each other, the boots according to the example exhibited a larger product "P"דL" (i.e., the value "A") than the product "P"דL" (i.e., the value "B") which were exhibited by the boots according to the comparative example.

Therefore, when the values "A" and "B" are applied to the vertical axis of FIG. 4, it is appreciated that the two-crest compact ratio is much smaller in the boots according to the example than the two-crest compact ratio in the boots according to the comparative example. Hence, it is understood that it is possible to sharply downsize the boots according to the example.

Note that, in a case where the time, which is required until the abnormal noises generate, falls in a range of "t" sec. or more, the value "P"דL" exhibited by the example falls in a range of from 2 to 4.5 times as much as the value "P"דL" exhibited by the comparative example. Accordingly, it is apparent that the value "P"דL" can desirably fall in this range.

Having now fully described the present invention, it will be apparent to one of ordinary skill in the art that many changes and modifications can be made thereto without departing from the spirit or scope of the present invention as set forth herein including the appended claims.

What is claimed is:

1. A boot for a constant velocity universal joint, comprising:
   a minor-diameter cylindrical member being held to a shaft;
   a major-diameter cylindrical member being separated from the minor-diameter cylindrical member, being disposed coaxially with the minor-diameter cylindrical member and having a diameter larger than that of the minor-diameter cylindrical member; and
   a bellows member, which integrally connects the minor-diameter cylindrical member with the major-diameter cylindrical member and which is substantially has the shape of a truncated cone, is formed of a thermoplastic elastomer and has a sliding friction coefficient of less than 0.6 when wetted with water, and the bellows member includes crests, in the cross section of the bellows member involving the central axis, and the peaks of the crests, except for the crest neighboring the major-diameter cylindrical member and the crest neighboring the minor-diameter cylindrical member, are located on an inner side of a straight line connecting the peak of the crest neighboring the major-diameter cylindrical member with the peak of the crest neighboring the minor-diameter cylindrical member, wherein, when said bellows member is cut by a plane involving the axis, a line connecting the peaks of the crests is arcuate and has a radius R from 100 to 200 mm.

2. The boot according to claim 1, wherein at least said bellows member is formed of a thermoplastic elastomer including a compound exhibiting a high affinity to water as well as a low friction coefficient and being capable of leaching out on the surface of the bellows member.

3. The boot according to claim 1, wherein, when the crest, neighboring said major-diameter cylindrical member has an outside diameter of $S_1$, and the crest next to said crest has an outside diameter of $S_2$, a two-crest compact ratio, which is expressed by $S_2/S_1$ is $0.77 \leq S_2/S_1 \leq 0.85$.

4. A boot for a constant velocity universal joint, comprising:
   a minor-diameter cylindrical member being held to a shaft;
   a major-diameter cylindrical member being separated from the minor-diameter cylindrical member, being disposed coaxially with the minor-diameter cylindrical member and having a diameter larger than that of the minor-diameter cylindrical member; and
   a bellows member, which integrally connects the minor-diameter cylindrical member with the major-diameter cylindrical member and which is substantially has the shape of a truncated cone, is formed of a thermoplastic elastomer and has a sliding friction coefficient of less than 0.6 when wetted with water, and the bellows member includes crests, in the cross section of the bellows member involving the central axis, and the peaks of the crests, except for the crest neighboring the major-diameter cylindrical member and the crest neighboring the minor-diameter cylindrical member, are located on an inner side of a straight line connecting the peak of the crest neighboring the major-diameter cylindrical member with the peak of the crest neighboring the minor-diameter cylindrical member, wherein said bellows member includes a plurality of crests and roots, at least a first root, a first crest, a second root, a second crest, a third root and a third crest, being disposed alternately in this order from the side of said major-diameter cylindrical member, and the outside diameter of the first crest is substantially identical with the outside diameter of said major-diameter cylindrical member, and, in the cross section when said bellows member is cut by a plane involving the axis, a distance from the peak of the first crest to the second root, and then to the second crest is substantially equal to a distance from the peak of the second crest to the third root and then to the peak of the third crest, and, when the second root has a depth h and the third root has a depth H the depth h falls in a range of $H/1.3 \leq h \leq H/1.1$.

5. The boot according to claim 4, wherein at least said bellows member is formed of a thermoplastic elastomer including a compound exhibiting a high affinity to water as well as a low friction coefficient and being capable of leaching out on the surface of the bellows member.

6. The boot according to claim 4, wherein, when the crest neighboring said major-diameter cylindrical member has an outside diameter of $S_1$, and the crest next to said crest has an outside diameter of $S_2$, a two-crest compact ratio, which is expressed by $S_2/S_1$, is $0.77 \leq S_2/S_1 \leq 0.85$.

7. The boot according to claim 4, wherein, when said bellows member is cut by a plane involving the axis, a line connecting the peaks of the crests is arcuate and has a radius R from 100 to 200 mm.

* * * * *